United States Patent
Corghi

(10) Patent No.: US 7,174,646 B2
(45) Date of Patent: Feb. 13, 2007

(54) SUPPORT BRACKET FOR SENSORS

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 11/265,195

(22) Filed: Nov. 3, 2005

(65) Prior Publication Data

US 2006/0096109 A1    May 11, 2006

(30) Foreign Application Priority Data

Nov. 11, 2004    (IT) ........................... RE2004A0137

(51) Int. Cl.
    *G01B 5/255*    (2006.01)
    *F16M 13/02*    (2006.01)
(52) U.S. Cl. .................... 33/203.18; 248/542
(58) Field of Classification Search .................. 33/203, 33/203.18, 203.19, 203.2, 288, 600; 248/542
    See application file for complete search history.

(56) References Cited

U.S. PATENT DOCUMENTS

| | | | | |
|---|---|---|---|---|
| 3,709,451 A | * | 1/1973 | Graham | .............. 33/203.18 |
| 3,990,666 A | * | 11/1976 | Morrison et al. | .......... 248/205.1 |
| 5,174,032 A | * | 12/1992 | Beck | ............................ 33/203 |
| 5,339,508 A | * | 8/1994 | Ventress | ................... 33/203.18 |
| 5,446,967 A | | 9/1995 | Gender | |
| 6,138,366 A | | 10/2000 | Boess | |
| 6,507,988 B1 | * | 1/2003 | Riviere | ..................... 33/203.19 |
| 6,622,389 B1 | * | 9/2003 | Pellegrino | ................ 33/203.18 |
| 6,708,419 B2 | | 3/2004 | Corghi | |
| 2002/0170195 A1 | * | 11/2002 | Corghi | ..................... 33/203.18 |
| 2003/0159298 A1 | * | 8/2003 | Mieling | .................... 33/203.15 |

FOREIGN PATENT DOCUMENTS

| | | |
|---|---|---|
| DE | 200184414 U1 | 2/2001 |
| EP | 1167944 A2 | 6/2001 |

* cited by examiner

*Primary Examiner*—G. Bradley Bennett
(74) *Attorney, Agent, or Firm*—Browdy and Neimark, PLLC

(57) ABSTRACT

A support bracket (1) for sensors adapted to be fastened to the wheel cover of a wheel mounted on a vehicle, comprising a central body from which there derives on one side a support device (3) of the sensor, and on the opposite side at least three devices (7) adapted to be engaged in the lugs which fasten the wheel cover to the vehicle; at least one of said engagement devices (7) comprises a jaw (73), placed at the end of a rod (72) sliding in a tubular body (70), adapted to be inserted on the head of a fastening screw of the wheel cover, means being foreseen to slide the rod in the tubular body so that it enlarges and tightens the jaw.

10 Claims, 3 Drawing Sheets

SUPPORT BRACKET FOR SENSORS

The present invention refers to a support bracket intended to be associated with the wheels of motor vehicles, generally for the support of measurement instruments such as, for example, the sensors for the control of the attitude of vehicles.

The known support brackets are substantially subdivided into two typologies: those which hook to tyres, and those which hook to structural particulars of the wheel cover. The present invention refers to a support bracket belonging to this last typology and, more in particular, to a bracket adapted to be hooked to the lugs which fasten the wheel cover to the vehicle.

As is known, one such support bracket generally comprises a central body from which there derives, on one side, a support device of the sensor and, on the opposite side, self-centring means which bear engagement devices adapted to be inserted on the heads of the fastening screws, said engagement devices being substantially shaped as socket wrenches.

One of these brackets is completely described in the application of Italian Patent RE2001A000053 on behalf of the same Applicant.

One particularly important drawback of the known brackets lies in the fact that the engagement devices, realising a simple form connection with the heads of the fastening screws, do not guarantee a stable anchoring to the wheel cover. In particular, therefore, said brackets are not adapted to support the sensors during the observations with the wheel in movement (e.g. runout compensation). Another drawback is that said engagement devices may be effectively couple with only one typology of fastening screw (based on the shape and size of the head of the screw itself), making necessary the engagement of additional fittings in order to adapt the bracket to all of the other possible types, with lengthy equipping times.

Object of the present invention is to overcome the mentioned drawbacks in the context of a simple and rational solution.

Such object is achieved by means of a support bracket for sensors adapted to be fastened to the wheel cover of a wheel mounted on a vehicle, comprising a central body from which there derives on one side a support device of the sensor, and from the opposite side at least three devices adapted to be engaged in the lugs which fasten the wheel cover to the vehicle.

In particular, at least one of said engagement devices comprises a jaw, placed at the end of a rod sliding in a tubular body, adapted to be inserted on the head of a fastening screw of the wheel cover, means being foreseen to make the rod slide in the tubular body so that it enlarges and tightens the jaw.

Thanks to this solution, the support staff may be firmly tightened to the wheel cover of the vehicle, avoiding possible accidental disjunctions; moreover, since the jaw is capable of being adapted to various sizes of the head of the screws, a bracket conform to the invention may be associated with multiple typologies of wheel covers without additional fittings. According to a preferred embodiment of the invention, the said engagement devices are mounted on devices which advantageously permit the support device of the sensor coaxial with the centre of the wheel.

Further characteristics and advantages of the invention shall become evident from the reading of the following description provided as a non-limiting example, with the aid of the figures illustrated in the attached tables, in which.

Figure 1:
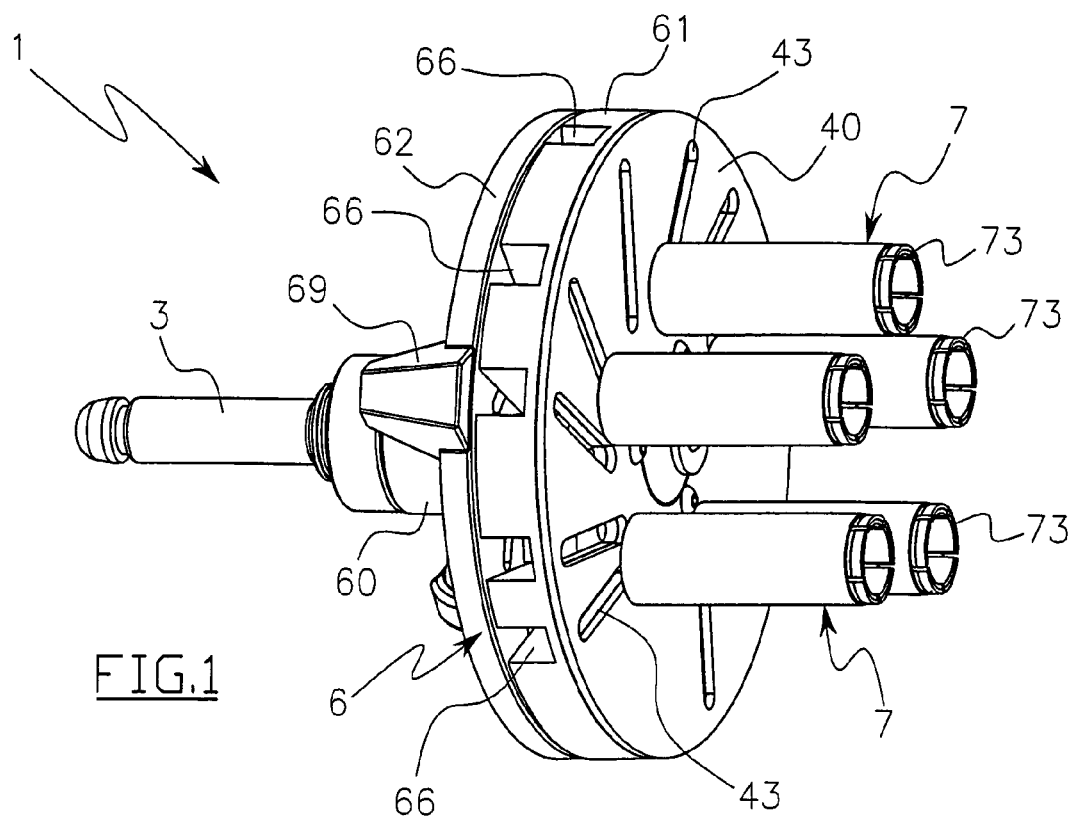
FIG. 1 is a perspective view of the support bracket according to the invention.

From the mentioned figures there appears a support bracket 1 for sensors adapted to the control of the attitude of a vehicle, which is intended to be secured to the wheel cover of a wheel mounted on the vehicle itself. Schematically (see FIG. 1), said support bracket 1 comprises a central body from which there derives, on one side, a set of engagement devices 7 adapted to be gripped to the heads of the screws which fasten the wheel cover to the vehicle and, on the opposite side, a support device of the sensor.

Said support device may be a pin 3, as illustrated in the figures, or it may be a hole or any other known means adapted to fasten a sensor to the bracket 1, without for this departing from the context of the present invention. The engagement devices 7 are arranged parallel to the support pin 3, and are dismountable/remountable with respect to the central body of the bracket 1 such that they may be substituted or varied in number; in particular, said engagement devices 7 must be at least three in order to guarantee a stable constraint of the bracket to the wheel, but may be increased, in relation with the number of the fastening lugs, until a maximum of six.

In detail (see FIG. 3), an engagement device 7 comprises a guide rod 72 sliding in a tubular body 70, in which a cylindrical housing 71 is coaxially made at one end.

The guide rod 72 has, at one end, a tract 72' projecting from the tubular body and adapted to be associated with the central body of the bracket 1 and, at the other end, a jaw 73 which is partially received, with the interposition of a spring 74, inside the housing 71.

Said jaw 73 is adapted to be inserted on the head of a corresponding fastening screw of the wheel cover and to be tight on this last, by means of the sliding of the guide rod 72 in the tubular body 70, so to firmly fasten the bracket 1 to the wheel cover.

In the particular case shown in FIG. 1, all of the engagement devices 7 of the bracket 1 are of the type just described, nevertheless it may be underlined that, in accordance with the invention, it is sufficient that only one of said devices 7 is equipped with the abovesaid clamping jaw 73; the remaining engagement devices being able to realise, with the respective fastening screws, simple form connections, or being able to be simple abutment elements, for example caps.

Figure 2:
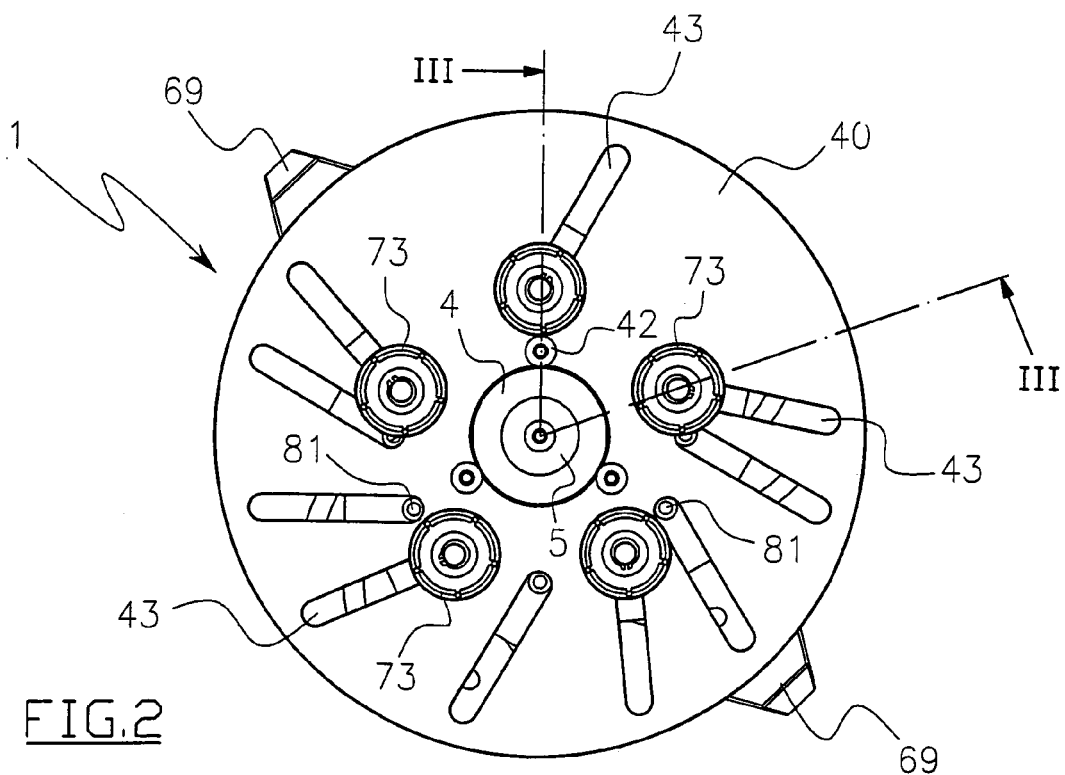
FIG. 2 is a frontal view of the device of FIG. 1.

Indeed, in this mode, as long as the provided engagement device of the jaw 73 is associated with the screw placed in a higher position, the bracket 1 results in any case stably fastened to the wheel. As is visible in FIG. 4, the jaw 73 is a cylindrical bush, preferably of plastic material, whose side wall is subdivided into a set of longitudinal tabs which delimit a substantially cylindrical reception seat for the head of a fastening screw (see also FIG. 2).

On its exterior (see FIG. 4), said cylindrical bush enlarges, toward the end of the longitudinal tabs, with a frustoconical section which normally remains positioned outside of the tubular body 70 (see FIGS. 1 and 3) and which, when pulled axially inside the housing 71, causes the simultaneous bending of all of the tabs toward the centre, tightening the jaw 73 and therefore clamping the head of the screw.

In accordance with the invention, the number of said longitudinal tabs is different from the number of the faces of the fastening screw; more in particular, as is visible in FIGS.

1 to 4, the number of said tabs is equal to five: one less with respect to the faces of a common screw of hexagonal head.

In this manner, during the clamping, each tab is compelled to always operate on at least one of the corners of the head of the screw, whatever the relative angular position of the jaw 73 with respect to the head itself; therefore, since said corners all lie on one same circumference, it is certain that all of the tabs, bending by the same quantity, simultaneously operate however way the jaw 73 is oriented.

Figure 3:
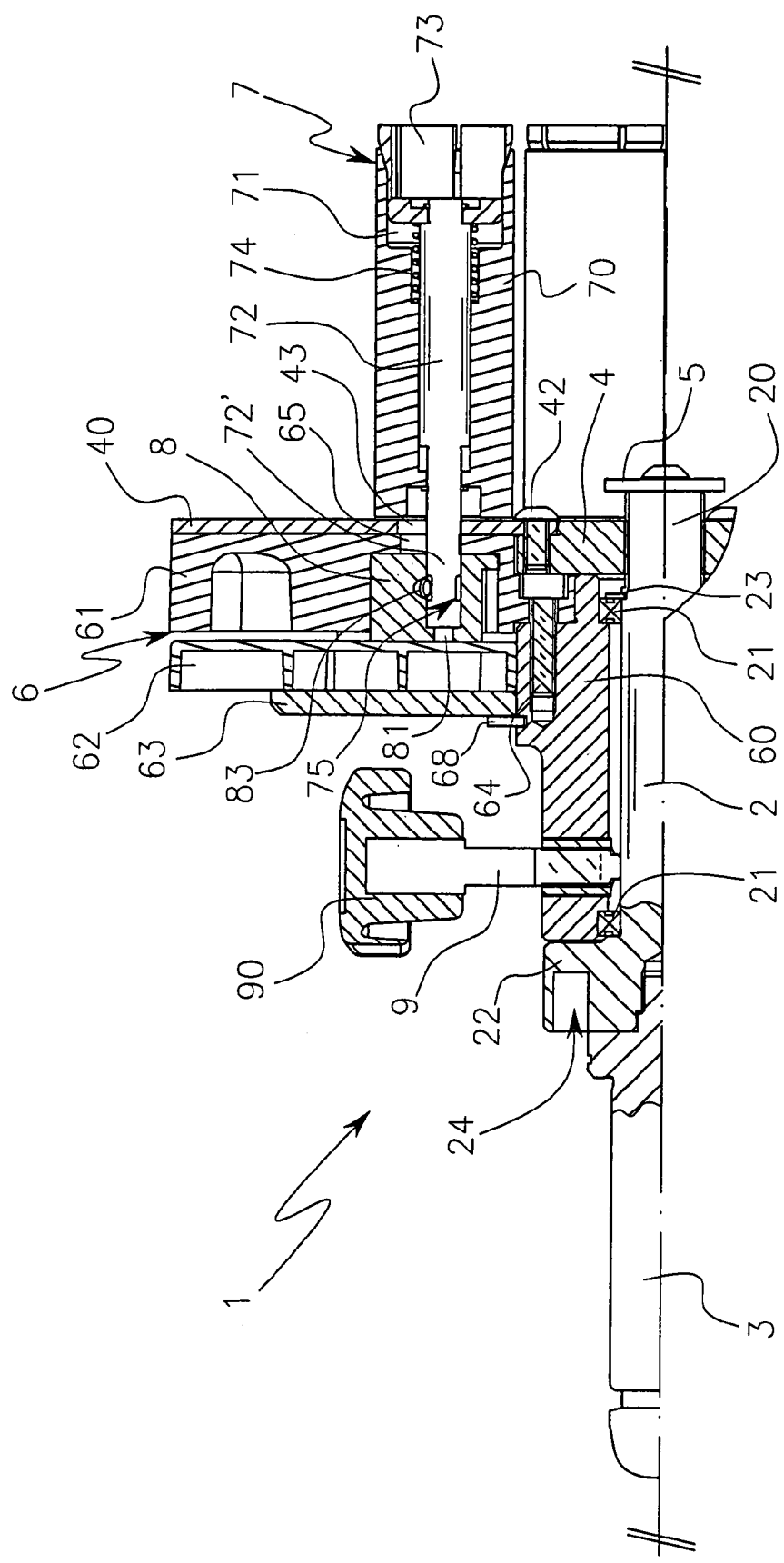
FIG. 3 is the section of trace III—III marked in FIG. 2.

As is well illustrated in FIG. 3, the tubular body 70 of each engagement device 7 abuts with a first circular plate 40, which is associated with the support pin 3 of the sensor by means of a screw/nut screw engagement.

More in detail, said screw/nut screw engagement is achieved by central shaft 2 which bears on one side the pin 3 and on the opposite side, a threaded tang 20 adapted to coaxially screw into a ring nut 4, which is firmly fastened to the centre of the first circular plate 40 by means of the screws 42.

In this manner, the first plate 40 and the support pin 3 may be mutually displaced in the axial direction by simply unscrewing/screwing the threaded tang 20 with respect to the ring nut 4, until this last does not meet the stop 5 fastened at the end of the tang 20 itself.

More in detail (see FIG. 4), the first plate 40 is equipped with rectilinear slits 43 oriented tangentially to a circle coaxial with the central shaft 2, and through which pass the rods 72 of the engagement devices 7 to be fastened to the movable parts of an underlying self-centring device, indicated in its entirety with 6 in FIGS. 1 and 3.

Said self-centring device 6 is adapted to cause radial displacements of the engagement elements 7, always maintaining them on a same circumference, concentric to the support pin 3 (see also FIG. 2), advantageously obtaining a drastic reduction of the time of accommodation of the bracket 1 to the diverse sizes of the wheel covers, and guaranteeing that the support pin 3 of the sensor always is coaxial with the centre of the wheel.

As is well illustrated in FIG. 3, the self-centring device 6 comprises a sleeve 60 to which a second plate 61 is coaxially fastened by means of screws 64, which faces the first plate 40 and is provided (see FIG. 4) with a set of blind rectilinear slots 66; said slots 66 being equipped with slits 65 matching with the slits of the first plate 40 itself.

Moreover, rotatably mounted on the sleeve 60 (see FIG. 3) are a third plate 62, coaxial and adjacent to the second plate 61, and an anti-twist ring 63 which result axially constrained by a Seeger ring 68.

Figure 4:
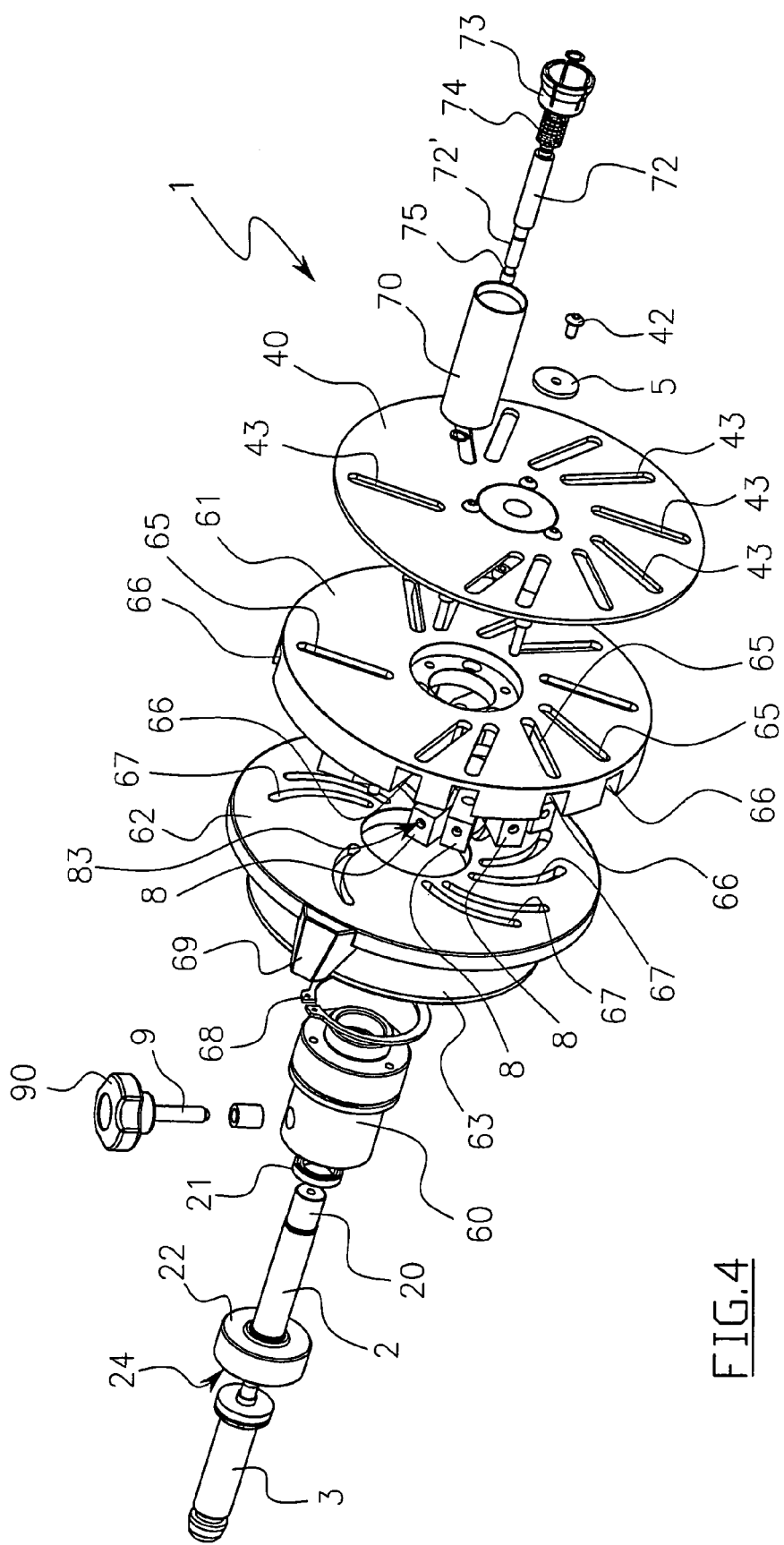
FIG. 4 is an exploded, perspective view of the device of FIG. 1.

As is well illustrated in FIG. 4, the third plate 62 is equipped with curved slits 67 which face, and intersect, with the slits 65 of the second plate 61, which bears, inside the rectilinear slots 66 the already mentioned movable parts of the self-centring device 6.

Said movable parts are in the shape of blocks 8 (see FIG. 4), sliding in the slots 66, and each equipped with a protuberance intended to be precisely received in a corresponding curved slit 67 of the third plate 62, so that the mutual rotations of the second and of the third plate, 61 and 62, make said blocks 8 move concentrically close to and away from the centre.

More in detail (see FIG. 3), each block 8 is found abutting on the bottom of the corresponding slot 66, and is provided with a first longitudinal hole 81 which, facing two coinciding rectilinear slits 43 and 65 of the first and second circular plate, it is adapted to receive the projecting tract 72' of the rod 72 of an engagement device 7.

A second threaded hole leads within said first hole 81, adapted to house a common threaded grub screw 83, so that the tip of said threaded grub screw 83 (see FIG. 3) engages itself in a groove 75 of the rod 72, axially constraining this last to the block 8.

In particular (see FIG. 4), said threaded grub screw 83 has its axis parallel to the defined direction of the corresponding slot 66 and is turned outward to be easily accessible to an operator, by means of a socket head wrench; this with the object of rendering the mounting and dismounting of each engagement device 7 of the bracket 1 very easy, and consequently also quite fast.

As is well illustrated in FIG. 3, the sleeve 60 of the self-centring group 6 is rotatably associated with the central shaft 2 by means of a couple of bearings 21, and is axially constrained to the same by means of a shoulder 22 and a Seeger ring 23, so that said self-centring group 6, in its entirety, is obligated to be axially displaced with respect to the first plate 40 following the screwing/unscrewing of the central shaft with respect to the ring nut 4.

In this manner, the moving close and away of the first plate 40 to and from the self-centring device 6 causes the sliding of the rods 72 in the tubular bodies 70, and the opening or clamping of the jaw 73.

In use, first the engagement devices 7 are associated with the bracket 1.

To such end, projecting tracts 72' of the rods 72 are inserted inside two coinciding slits, 43 and 65, of the first and second plate, 40 and 61, and there they are engaged in the holes 81 of the corresponding sliding blocks 8, fastening them, finally, by means of threaded grub screws 83.

In this configuration, the first and the second plate, 40 and 61, are integral in rotation, and the engagement devices 7 result arranged on a same circumference, equidistant from each other.

After this, by means of the handle 69 (see FIGS. 1, 2, and 4), the third plate 62 is rotated with regard to the second plate 61, causing the simultaneous sliding of the blocks 8, and consequently the regulation of the diameter of the circumference on which the engagement devices 7 lie.

The desired position achieved, all of the jaws 73 are simultaneously inserted on the heads of the corresponding screws, hence the central shaft 2 are engaged in rotation in the direction of the unscrewing by means of an appropriate operating wrench (not shown); said operating wrench coupling (see FIG. 3) with a corresponding seat 24, made in the central shaft 2 and placed at the shoulder 22.

In this manner, the self-centring group 6, which as said is rotatably mounted and axially constrained to the central shaft 2, remains stopped, and the first circular plate 40 translates in a parallel manner to itself, moving ahead.

Consequently (see FIG. 3), the tubular body 70 of each engagement device 7 is pushed by the first plate 40, and moves, with regard to the rod 72 which is integral with the self-centring device 6, such to engage the jaw 73 inside the housing 71, in contrast with the action of the spring 74.

The frustoconical tract of said jaw 73 induces therefore the simultaneous bending of the longitudinal tabs, which, tightening like vices around the head of the screw, integrally fasten the bracket 1 to the wheel cover.

Since each engagement device 7 is associated with the same first and second circular plates, 40 and 61, each rotation of the central body 2 corresponds with the same axial displacement of the tubular bodies 70 with regard to the jaws 73 and, therefore, the same bending of the longitudinal tabs.

Therefore, the fact that said tabs operate on the corners of the heads of the screws and therefore that the jaws 73 rest on circumferences having the same size (the screws are all the same), makes the simultaneous clamping of all lugs possible and, consequently, the secure and stable locking of the bracket 1 to the wheel cover, with a single action by the operator.

After this (see FIG. 3), to avoid accidental loosening of the grip, it is provided that a threaded pin 9 is to be manually screwed, by means of the operating knob 90, inside a hole in the sleeve 60, such that, radially pushing on the side surface of the central shaft 2, it prevents the central shaft 2 from further rotating.

To dismount the bracket it will be sufficient to reverse the above-described operations.

The invention claimed is:

1. Support bracket (1) for sensors adapted to be fastened to the wheel cover of a wheel mounted on a vehicle, comprising a central body from which there derives on one side the support device (3) of the sensor, and on the other side at least three devices (7) adapted to be engaged in the lugs which fasten the wheel cover to the vehicle,
   characterised in that
   at least one of said engagement devices (7) comprises a jaw (73), placed at the end of a rod (72) sliding in a tubular body (70), adapted to be inserted on the head of a fastening screw of the wheel cover, means being foreseen to make the rod slide in the tubular body so that it enlarges and tightens the jaw.

2. Bracket according to claim 1, characterised in that the means to make the rod slide inside the tubular body comprise a first flat circular plate (40) associated with the support device (3) of the sensor by means of a screw/nut screw engagement, on which first plate the tubular bodies (70) abut and which is equipped with rectilinear slits (43) oriented tangentially to a circle coaxial with the support device (3) through which the rods (72) pass, which are fastened to the movable parts of an underlying self-centring device which is axially locked to the support device (3) of the sensor, such that the first plate's moving close to and away from the self-centring device causes the sliding of the rods (72) in the tubular bodies (70) and the opening or clamping of the jaws (73).

3. Bracket according to claim 2, characterised in that the self-centring device comprises a second plate (61) equipped with blind rectangular slots (66) equipped with slits (65) matching with those of the first plate, and a third plate (62) rotatably mounted with respect to the support device (3) and to a second plate (61) and equipped with curved slits (67) which face and intersect with the slits of the adjacent second plate (61), in the slots (66) of this last there being placed the movable parts of the self-centring device in the form of blocks (8), also sliding and engaged in the curved slots of the third plate (62) so that the reciprocal rotations of the second and third plate make the blocks (8) move concentrically close to and away from the centre.

4. Bracket according to claim 1, characterised in that said jaw is a cylindrical bush (73) whose side wall is subdivided into a set of longitudinal tabs which delimit a reception seat for the head of the fastening screw.

5. Bracket according claim 4, characterised in that said tabs are of a different number than the faces of the screw, in order to obtain the secure locking on all of the lugs with the tabs which always operate on the corners of the same.

6. Bracket according to claim 4, characterised in that the bush (73) has an outer cylindrical conformation which enlarges, at the end of the tabs, with a frustoconical tract,
   said frustoconical tract being normally positioned outside of the tubular body (70), so that, when pulled to the inside of the same, it causes the simultaneous bending of all of the tabs toward the centre.

7. Bracket according to claim 6, characterised in that said cylindrical bush (73) is in plastic material.

8. Bracket according to claim 3, characterised in that each sliding block (8) of the self-centring device comprises a longitudinal hole (81) which, facing the two matching slits (43, 65) of the first and second plate, is adapted to receive the guide rod (72), and means to lock said guide rod to the inside of said longitudinal hole (81).

9. Bracket according to claim 8, characterised in that said means to lock said guide rod comprise a threaded hole which, made in the body of the sliding block (8), leads transversely into the longitudinal hole (81), and an insert (83) which, screwing into said threaded hole, projects inside the longitudinal hole (81) and is engaged in a groove (75) of the guide rod (72).

10. Bracket according to claim 1, characterised in that the engagement devices (7) are mounted on devices which permit to always have the support device (3) of the sensor coaxial with the centre of the wheel.

* * * * *